US006064399A

United States Patent [19]
Teo

[11] Patent Number: 6,064,399
[45] Date of Patent: May 16, 2000

[54] METHOD AND SYSTEM FOR PANEL ALIGNMENT IN PANORAMAS

[75] Inventor: Patrick Cheng-San Teo, Redwood City, Calif.

[73] Assignee: MGI Software Corporation, Richmond Hill, Canada

[21] Appl. No.: 09/055,038

[22] Filed: Apr. 3, 1998

[51] Int. Cl.[7] .................................................. G06F 15/00
[52] U.S. Cl. .......................................................... 345/435
[58] Field of Search ................................... 345/435, 440, 345/441, 442, 114, 115, 117

[56] References Cited

U.S. PATENT DOCUMENTS

| | | | |
|---|---|---|---|
| 4,763,280 | 8/1988 | Robinson et al. | 364/518 |
| 4,811,245 | 3/1989 | Bunker et al. | 364/521 |
| 4,841,292 | 6/1989 | Zeno | 340/736 |
| 5,255,360 | 10/1993 | Peaslee et al. | 345/430 |
| 5,396,583 | 3/1995 | Chen et al. | 395/127 |
| 5,446,833 | 8/1995 | Miller et al. | 395/125 |
| 5,748,194 | 5/1998 | Chen | 345/427 |
| 5,761,401 | 6/1998 | Kobayashi et al. | 345/430 |

OTHER PUBLICATIONS

"Stream Processing Architecture for Real–Time Implementation of Perspective Spatial Transformations", J.D. Evemy, PhD, et al., IEEE Proceedings, vol. 137, Pt. I, No. 3, Jun. 1990, pp. 123–128.

"Parallel Algorithms for Visualising Image Surfaces", P.K. Robertson, Image Processing and Its Applications, 1989, CSIRO Division of Information Technology, Australia, pp. 472–476.

"Image Description and 3–D Reconstruction from Image Trafectories of Rotational Motion", Harpreet S. Sawhney, et al., IEEE Transactions on Pattern Analysis and Machine Intelligence, vol. 15, No. 9, Sep. 1993, pp. 885–898.

Second Edition, Computer Graphics, Principles and Practice, Section 6.1, J.D. Foley et al., Addison–Wesley Publishing Company, 1990.

"Mapping Arbitrary Projections for Volume Rendering onto an Array Processor", C.H. John Ju, et al., Proceedings of International Conference on Application Specific Array Processors, Oct. 25, 1993, pp. 160–163.

Website at http://www.livepicture.com, May 19, 1998.

*Primary Examiner*—Phu K. Nguyen
*Attorney, Agent, or Firm*—Blakely, Sokoloff, Taylor & Zafman

[57] ABSTRACT

A method and system for constructing a panoramic image including the steps of applying panoramic curvature to at least one image, thereby to create a panoramic background embedding in the panoramic background an additional image having a geometry other than that of the panoramic curvature thereby to provide a composite panoramic image containing an embedded image corresponding to the additional image and whose geometry matches that of the panoramic background.

32 Claims, 6 Drawing Sheets

METHOD AND SYSTEM FOR PANEL ALIGNMENT IN PANORAMAS

FIELD OF THE INVENTION

The present invention relates to panel alignment in panoramic images.

BACKGROUND OF THE INVENTION

Panoramic images of scenes are used to provide a viewer with an immersive surround experience, as if the viewer was standing in the center of a scene gazing in several directions. Panoramic images can be produced by taking multiple snapshots of a scene, as a camera is rotated horizontally and possibly also vertically. The snapshots are joined together and projected onto an appropriate geometrical surface, such as a cylinder or sphere, to reproduce an omniview effect.

Digital panoramic images are used inter alia to provide virtual reality experiences over the Internet. These images are normally stored on a host computer, or server, and accessed by users over the Internet. Software panorama production tools take digital snapshots as inputs, and numerically stitch them together and project them onto an appropriate curved surface. The digital snapshots may come from a digital camera, or from scanned in pictures. An example of a software system used to produce panoramic images is assignee's PHOTOVISTA™ product, which can be accessed at http://www.livepicture.com.

Interactive panorama viewers comprise software that enables a client computer to display a portion of the panorama, so that a user sees a corresponding part of the surrounding scene. The viewers carry out perspective geometry transformations that project the panorama onto a view window. Although only a portion of the scene can displayed within the view window, the panoramic viewer enables the user to interactively navigate the scene. User navigation includes (i) panning in several directions, which translates the viewable portion of the scene, and (ii) zooming in and out, which magnifies an reduces the scene, effectively changing the field of view. An example of a panorama viewer is assignee's LIVE PICTURE™ Viewer product, which can be accessed at http://www.livepicture.com.

A problem in working with panoramic images is the difficulty of editing them. Even such a simple operation as linear scaling is difficult to perform, since the panoramic images are warped onto the shape of a cylinder or sphere. For example, if a 512×2,048 pixel digital cylindrical panorama is linearly re-sized to 256×1,024 pixels, the result of displaying the re-sized panorama with a panorama viewer will not look real. The re-sized panorama will not be properly warped. This is due to the fact that the pixel values in the 512×2,048 panorama were computed by non-linearly projecting digitized snapshots onto a round cylindrical surface at an original sampling rate corresponding to 512 pixels in the vertical dimension and 2,048 pixels in the horizontal dimension. Linearly re-sizing the 512×2,048 panorama does not correspond to projecting these digitized snapshots at half the original sampling rate. In fact, to carry out the re-sizing it is necessary to re-project the snapshots onto the cylindrical surface at half the original sampling rate, or to carry out an equivalent mathematical transform.

Compositing images over a panorama is an even more difficult task. If an image to be composited is simply laid down "flat" over a panorama, the resulting composite image, when viewed by a panorama viewer, will be out of perspective with the scene. For example, suppose a panoramic scene is taken as a rotating camera sequentially views four walls of a room. On one of the walls is a picture in a frame. A typical compositing operation would be to overlay a new picture within the picture frame. If this new picture is simply laid down "flat" over the frame, then when a user glides through the scene, the picture will be out of perspective, and it will not have the natural look that a picture in a frame is supposed to have. Similarly, if there is a television in the room, one might want to display a video movie segment within the frame of the television. Again, if the video frames are simply laid down "flat" over the television frame, then the video will be out of perspective, and not have the natural look of a movie playing from a television set within the scene.

Assignee's co-pending U.S. patent application Ser. No. 08/647,018 filed May 8, 1996 and entitled RENDERING PERSPECTIVE VIEWS OF A SCENE USING A SCANLINE-COHERENT LOOK-UP TABLE, the disclosure of which is hereby incorporated by reference, discloses a panorama viewing method and system. It describes an efficient way to provide pan and zoom navigational capabilities, so as to enable a user to have a smooth experience as the user interactively views panoramic images. To ensure smooth navigation it is important that the rendering be optimized so as to yield successive frame data at a re-fresh rate of approximately 30 frames/second.

Assignee's co-pending U.S. patent application Ser. No. 08/922,732 filed Sep. 3, 1997 and entitled A METHOD AND SYSTEM FOR COMPOSITING IMAGES, the disclosure of which is hereby incorporated by reference, describes a way to stitch panoramic snapshots together in a way that compensates for possible different lighting conditions in each snapshot. To reproduce an original scene, it is important that there be no visible signs of stitching between successive snapshots.

SUMMARY OF THE INVENTION

The present invention describes a method and system for embedding images and video segments within a panoramic image of a scene, so as to maintain the proper perspective. By using the present invention, a producer can create a composite panorama, with a desired image or video segment embedded. When standard panorama viewer software is used to interactively display selected portions of the scene, the scene appears natural, or real, to the user.

The present invention operates by identifying, for any suitably selected four points within a given panoramic image, the location and orientation of a planar parallelogram situated in three-dimensional space, the vertices of which parallelogram project onto the selected points. That is, the parallelogram has the property that when projected onto the geometry of the panorama, such as a cylinder or sphere, its vertices map onto the four selected points of the panoramic image.

Once the above parallelogram is identified, the desired image or video segment, which is rectangular in shape, can be linearly mapped onto the parallelogram, and then further projected onto the panorama. The panorama is then modified at pixel locations within the region determined by the projected parallelogram, according to the pixel values of the projected image or video, thereby forming a composite panorama having the image or video properly embedded therein with the correct perspective, orientation and curvature.

There is thus provided in accordance with a preferred embodiment of the present invention a method for constructing a composite panoramic image including the steps of applying panoramic curvature to at least one image, thereby to create a panoramic background, and embedding in the panoramic background an additional image, having a geometry other than that of the panoramic curvature prior to being embedded, thereby to provide a composite panoramic image containing an embedded image corresponding to the additional image and whose geometry matches that of the panoramic background.

Moreover in accordance with a preferred embodiment of the present invention the embedding step applies the panoramic curvature of the panoramic image to the additional image.

Additionally in accordance with a preferred embodiment of the present invention the panoramic curvature corresponds to curvature of a geometrical surface.

Further in accordance with a preferred embodiment of the present invention the embedding step includes selecting an embedding location for embedding the additional image.

Still further in accordance with a preferred embodiment of the present invention the selecting step uses four user-specified vertices within the panoramic background to select the embedding location.

Moreover in accordance with a preferred embodiment of the present invention the embedding step includes determining a planar parallelogram characterized in that its four vertices, when projected onto the geometrical surface, project onto the four user-specified vertices.

Additionally in accordance with a preferred embodiment of the present invention the panoramic background contains pixel locations with pixel values, and the embedding step includes identifying panorama pixel locations of the panoramic background that lie within the projection of the planar parallelogram onto the geometrical surface, transforming each of the panorama pixel locations into local coordinates in the planar parallelogram, transforming the local coordinates in the planar parallelogram into an embedded pixel location of the additional image, computing an embedded pixel value at the embedded pixel location of the additional image, and modifying the pixel value of the panoramic background at the panorama pixel location based upon the embedded pixel value.

Further in accordance with a preferred embodiment of the present invention the identifying step uses the four vertices of the planar parallelogram to test if a candidate panorama pixel location lies within the projection of the planar parallelogram onto the geometrical surface.

Still further in accordance with a preferred embodiment of the present invention the second transforming step uses a linear transformation.

Moreover in accordance with a preferred embodiment of the present invention the computing step uses linear interpolation based on pixel values of the additional image at pixel locations in the vicinity of the embedded pixel location.

Additionally in accordance with a preferred embodiment of the present invention the modifying step replaces the pixel value of the panoramic background with the embedded pixel value.

Further in accordance with a preferred embodiment of the present invention the four user-positioned vertices are interactively specified by means of a user interface.

Moreover in accordance with a preferred embodiment of the present invention the user interface enables a user to interactively adjust at least one of the four user-positioned vertices by means of an input device.

Additionally in accordance with a preferred embodiment of the present invention the user interface interactively displays a curved quadrilateral framing a projection of the planar parallelogram onto the geometrical surface.

Further in accordance with a preferred embodiment of the present invention the user interface also interactively displays a center point corresponding to a projection of the center of the planar parallelogram onto the geometrical surface.

Still further in accordance with a preferred embodiment of the present invention the user interface also enables a user to interactively move the center point by means of an input device.

There is also provided in accordance with a preferred embodiment of the present invention a panoramic image production system including an image processor applying panoramic curvature to at least one image, thereby to create a panoramic background, and an image compositor, embedding in the panoramic background an additional image having a geometry other than that of the panoramic curvature prior to the embedding, thereby to provide a composite panoramic image containing an embedded image corresponding to the additional image and whose geometry matches that of the panoramic background.

Moreover in accordance with a preferred embodiment of the present invention the image compositor applies said panoramic curvature to the additional image.

Additionally in accordance with a preferred embodiment of the present invention the panoramic curvature corresponds to curvature of a geometrical surface.

Further in accordance with a preferred embodiment of the present invention the image compositor includes a selector, selecting an embedding location for embedding the additional image.

Still further in accordance with a preferred embodiment of the present invention the selector uses four user-specified vertices within the panoramic background to select the embedding location.

Moreover in accordance with a preferred embodiment of the present invention the image compositor includes a geometry processor, determining a planar parallelogram characterized in that its four vertices, when projected onto the geometrical surface, project onto the four user-specified vertices.

Additionally in accordance with a preferred embodiment of the present invention the panoramic background contains pixel locations with pixel values, and the image compositor includes a pixel processor, identifying panorama pixel locations of the panoramic background that lie within the projection of the planar parallelogram onto the geometrical surface, a first pixel transformer, transforming each of the panorama pixel locations into local coordinates in the planar parallelogram, a second pixel transformer, transforming the local coordinates in the planar parallelogram into an embedded pixel location of the additional image, a pixel computer, computing an embedded pixel value at the embedded pixel location of the additional image, and a pixel modifier, modifying the pixel value of the panoramic background at the panorama pixel location based upon the embedded pixel value.

Further in accordance with a preferred embodiment of the present invention the pixel processor uses the four vertices of the planar parallelogram to test if a candidate panorama pixel location lies within the projection of the planar parallelogram onto the geometrical surface.

Still further in accordance with a preferred embodiment of the present invention the second pixel transformer is a linear transformer.

Moreover in accordance with a preferred embodiment of the present invention the pixel computer uses linear interpolation based on pixel values of the additional image at pixel locations in the vicinity of the embedded pixel location.

Additionally in accordance with a preferred embodiment of the present invention the pixel modifier replaces the pixel value of the panoramic background with the embedded pixel value.

Further in accordance with a preferred embodiment of the present invention the system includes a user interface for interactively specifying four user-positioned vertices.

Still further in accordance with a preferred embodiment of the present invention the user interface includes a position adjuster, enabling a user to interactively adjust at least one of the four user-positioned vertices by means of an input device.

Moreover in accordance with a preferred embodiment of the present invention the user interface includes a display, interactively displaying a curved quadrilateral framing a projection of the planar parallelogram onto the geometrical surface.

Additionally in accordance with a preferred embodiment of the present invention the display also interactively displays a center point corresponding to a projection of the center of the planar parallelogram onto the geometrical surface.

Further in accordance with a preferred embodiment of the present invention the position adjuster also enables a user to interactively move the center point by means of an input device.

BRIEF DESCRIPTION OF THE DRAWINGS

The present invention will be understood and appreciated more fully from the following description, taken in conjunction with the drawings in which.

LIST OF APPENDICES

Figure 1:
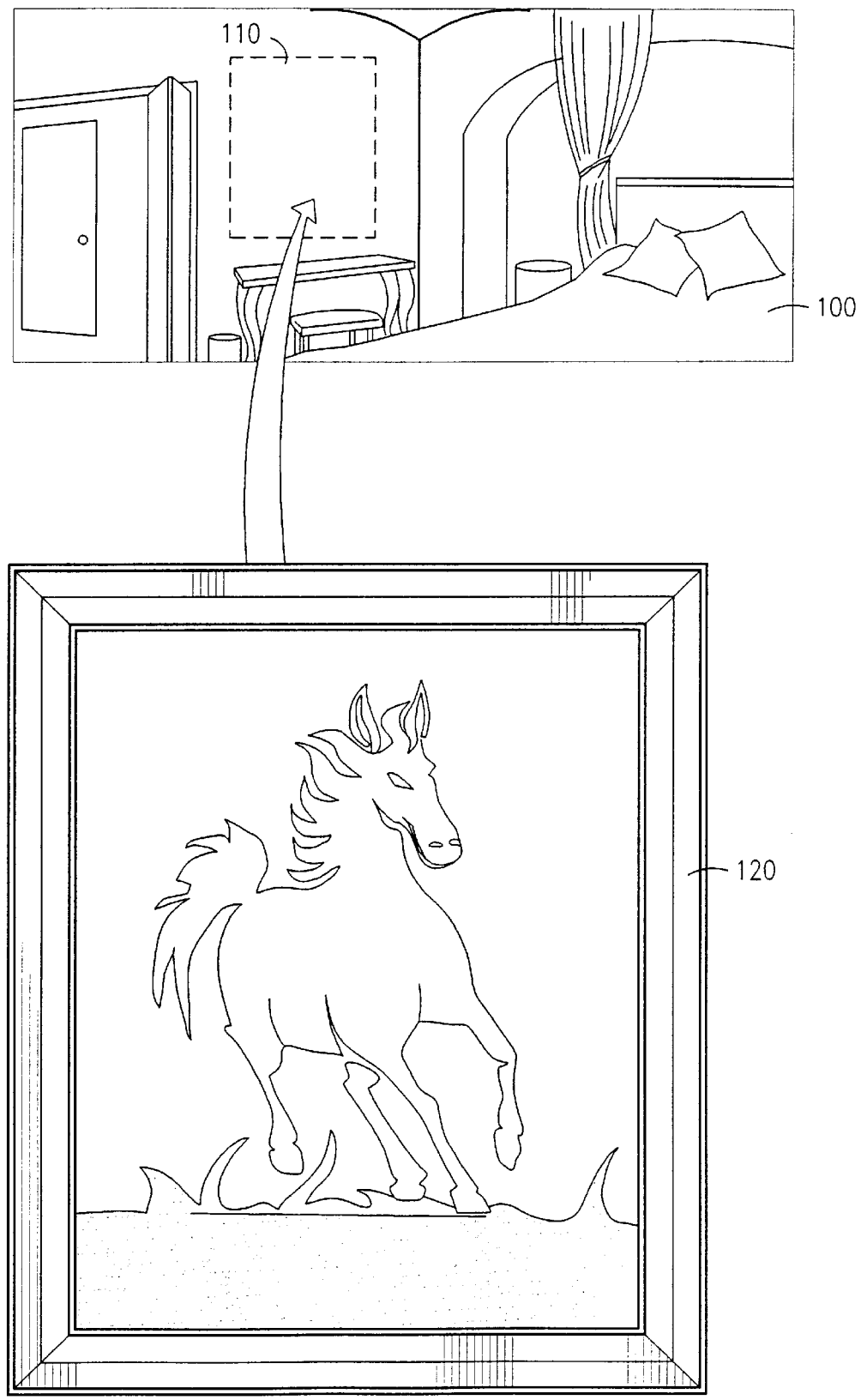
FIG. 1 is an illustration of a panorama of a suite, containing within it a frame specifying an embedding location on one of the walls.

Appendix A is a listing of exemplary software, in the form of C programming code, for implementing an application that (i) draws a changing curved quadrilateral corresponding to a projected parallelogram as a user interactively positions its vertices, and (ii) computes local parallelogram coordinates for each panoramic pixel location affected when an image or video segment is embedded into a user-selected location within a panorama.

DETAILED DESCRIPTION OF PREFERRED EMBODIMENTS

The present invention concerns a method and system for panel alignment in a panorama. It describes a method and system for embedding images and video segments within a panoramic image of a scene, so as to maintain the proper perspective. By using the present invention, a producer can create a composite panorama, with a desired image or video segment embedded. When standard panorama viewer software is used to interactively display selected portions of the scene, the scene appears natural, or real, to the user.

For purposes of clarity the discussion below relates to a cylindrical panorama with a vertically oriented axis of revolution, and to a spherical panorama. However, it can be appreciated by persons skilled in the art that the present invention is not restricted to a vertical oriented cylindrical or spherical surface geometry, and applies to many types of surface geometries, such as that of a cube or ellipsoid. In the following discussion, a vertically oriented cylinder is also referred to simply as a "cylinder."

The present invention operates by determining, for any suitably selected four points within a given cylindrical or spherical panoramic image, the location and orientation of a planar parallelogram situated in three-dimensional space, the vertices of which parallelogram project onto the selected four points. That is, the planar parallelogram has the property that when projected onto the geometry of the panorama, such as a cylinder or sphere, its four vertices map onto the four selected points within the panoramic image.

All projections referred to in this discussion are perspective projections. Such projections are characterized by a single point acting as a center of projection. In the ensuing discussion the center of projection will be positioned at the origin of a three-dimensional Cartesian coordinate system, for purposes of simplification. With this simplification, the projection of a non-zero point x in three-dimensional space onto a surface is the point y on the surface that is situated on the ray emanating from the origin and passing through x. In other words, y is the point of intersection of the ray through x with the surface. The projection, y, of the point x has the form y=a x, for some positive scalar a. Perspective projections are well known in the art, and are described in Section 6.1 of J. D. Foley, A. Van Dam, S. K. Feiner and J. F. Hughes, *Computer Graphics: Principles and Practice, $2^{nd}$ Edition*, Addison-Wesley Publishing Co., Reading, Mass., 1990, the contents of which are hereby incorporated by reference.

Continuing with the above description, once the above referenced planar parallelogram is identified, the desired image or video segment, which is rectangular in shape, can be linearly mapped onto the parallelogram, and then further projected onto the panorama. The panorama is then modified at pixel locations within the region determined by the projected parallelogram, according to the pixel values of the projected image or video, thereby forming a composite panorama having the image or video properly embedded with the correct perspective, orientation and curvature.

The actual pixel embedding works in the opposite direction. Specifically, by using the above referenced planar parallelogram one can determine which panoramic pixel locations in the panorama are to be affected by the embedding. At each such panoramic pixel location, one determines the local coordinates of the corresponding point within the planar parallelogram. These local coordinates are then mapped into embedded image or video pixel coordinates for the image or video segment to be embedded. Finally, the pixel value at the panoramic pixel location is then set to the embedded image or video pixel value at the embedded image pixel coordinates. Typically, the embedded image or video pixel coordinates computed in this way are non-integral, and some form of interpolation can be used so as to prevent aliasing. Details of these calculations are contained in the software listing in Appendix A, and described hereinbelow.

Reference is now made to FIG. 1 which illustrates a panorama 100 of a suite, containing within it a frame 110 specifying an embedding location on one of the walls. Also shown in FIG. 1 is a flat image of a framed wall picture 120. It is desired to embed the wall picture on the wall, in the location specified by frame 110. The embedding is to be done in such a way that the embedded image inherits the panoramic curvature.

Figure 2:
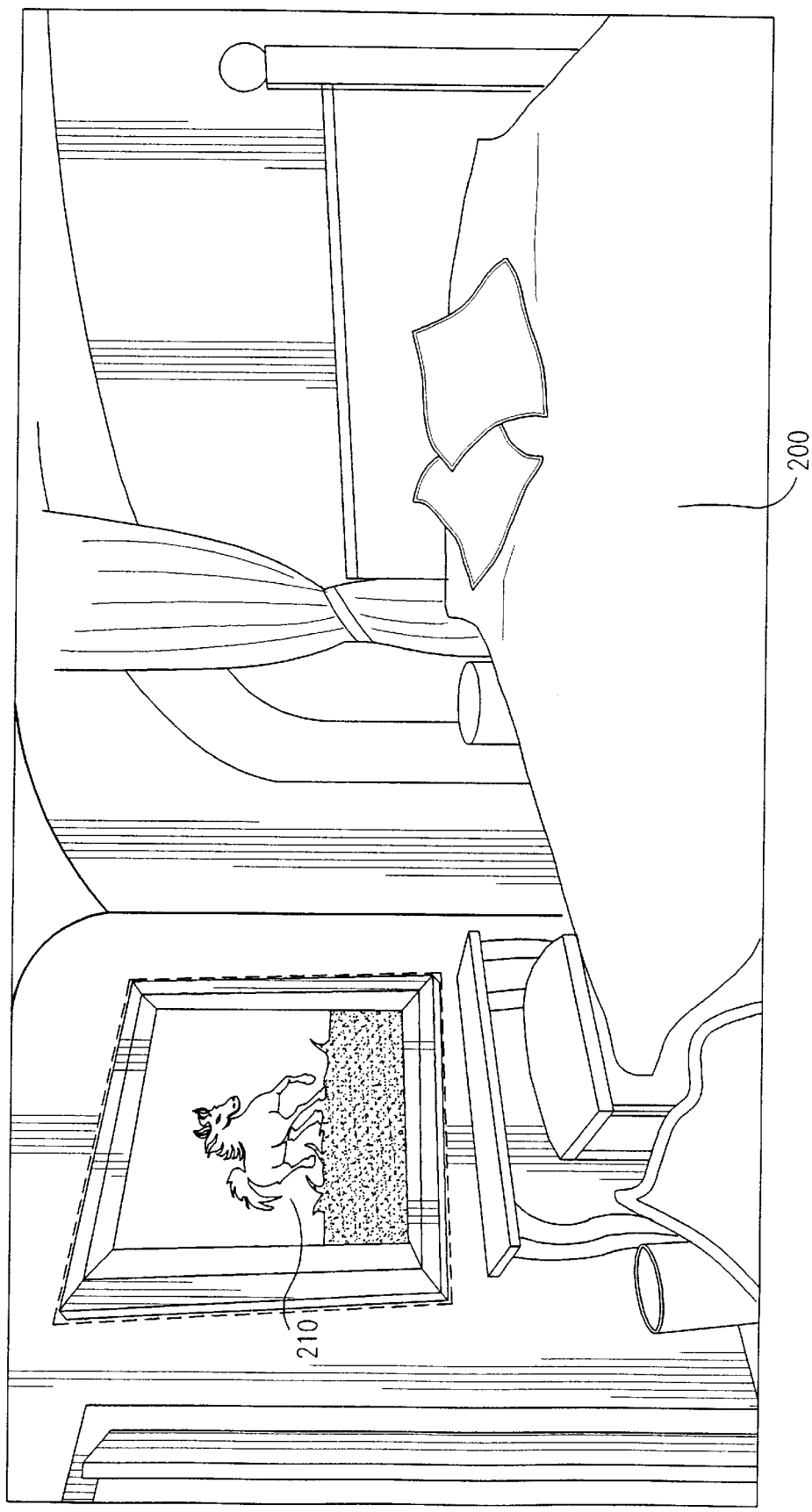
FIG. 2 is an illustration of a panorama with an image embedded into it with the correct curvature.

Reference is now made to FIG. 2 which illustrates panorama 200 with all picture 210 embedded into it with the correct curvature. Wall picture 210 corresponds to wall picture 120 from FIG. 1, but in FIG. 2 it is embedded with the panoramic curvature. As such it appears skewed, but is correct relative to panorama coordinates. When viewed with interactive panorama viewing software, the wall picture appears natural, and changes shape and size as the user navigates around the room.

Figure 3:
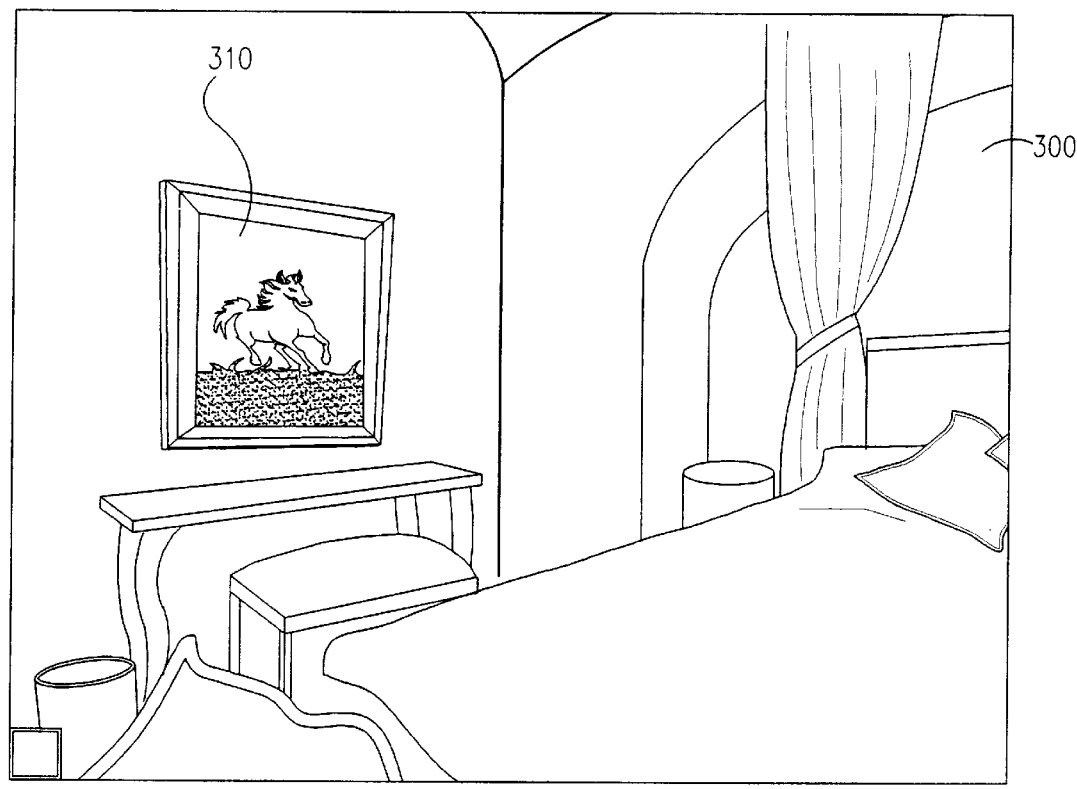
FIG. 3 is an illustration of an image portion of the panorama from FIG. 2, as viewed by panorama viewing software.

Reference is now made to FIG. 3 which illustrates an image portion 300 of panorama 200 (from FIG. 2) as viewed by panorama viewing software. Image portion 310 is corrected for view perspective, and as such appears natural. The embedded wall picture 310, being an integral part of the panorama, is also corrected for view perspective. Note, for example, that the edges of the bed are straight in FIG. 3, whereas they are curved in FIG. 2.

Figure 4:
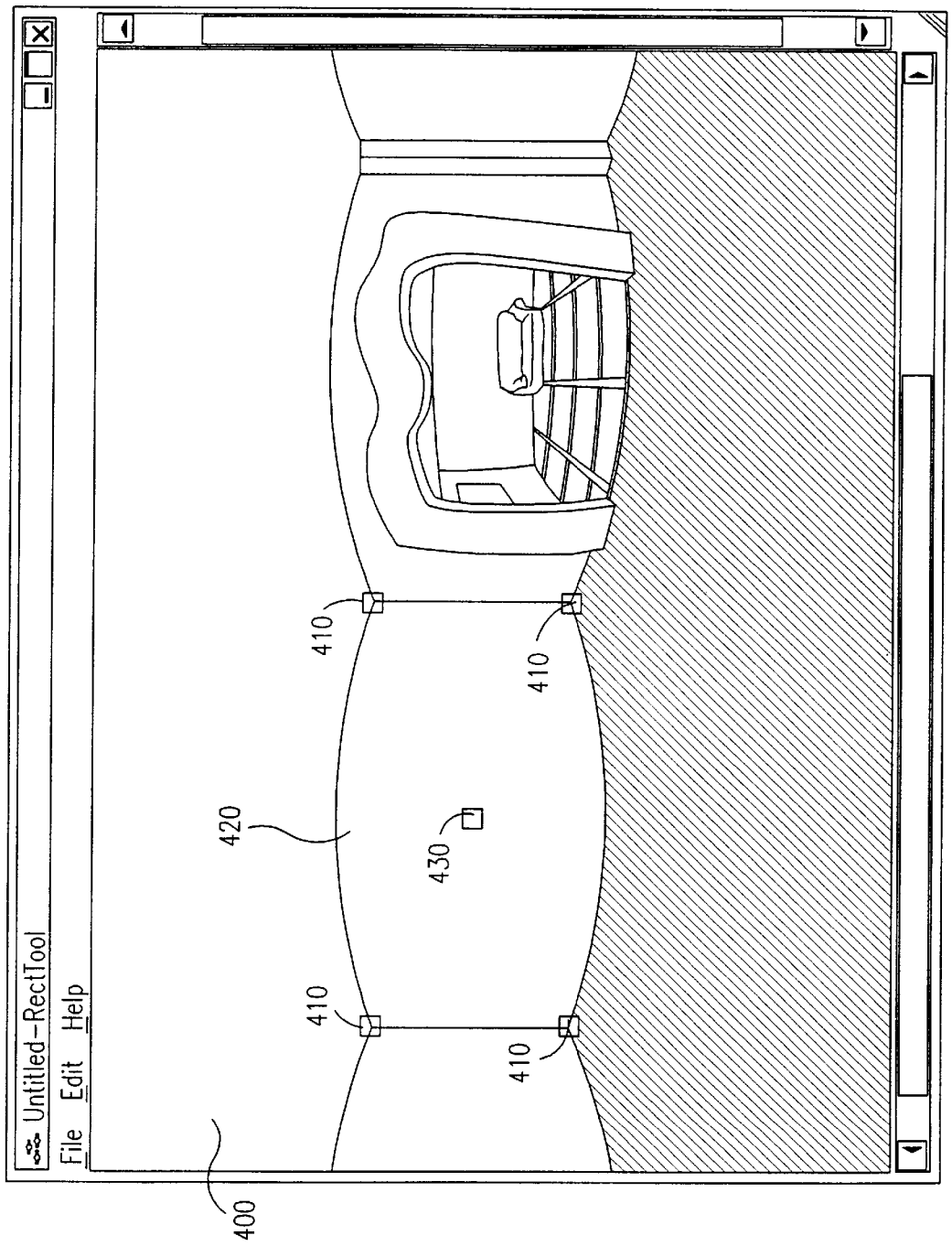
FIG. 4 illustrates a preferred user interface screen for implementing a preferred embodiment of the present invention.

Reference is now made to FIG. 4 which illustrates a preferred user interface screen for implementing a preferred embodiment of the present invention. Shown in FIG. 4 is a spherical panorama 400 illustrating a scene of a room. The panorama 400 is warped into the sphere, and does not appear in natural perspective. A panorama viewer would process the panorama 400 to project, or de-warp it onto a viewing plane, making it appear natural.

Four points labeled 410 appear in FIG. 4 which form the vertices of a curved quadrilateral 420. Quadrilateral 420 is characterized in that the curves joining two adjacent vertices are arcs of great circles, in the case of a spherical panorama, and arcs of "great ellipses" in the case of a cylindrical panorama. A "great ellipse" is an ellipse situated on the surface of the cylinder whose center is at the origin. In the special case of a vertically oriented ellipse, the "great ellipse" reduces to two parallel vertical lines situated on the surface of the cylinder. Any two distinct points on the surface of a sphere determine a unique great circle passing through them, and any two points on the surface of a cylinder determine a unique "great ellipse" passing through them.

In examining FIG. 4, note that the horizontal and vertical axes represent the spherical or cylindrical surface coordinates. Specifically, in the case of a spherical panorama, the horizontal axis represents the yaw angle $\theta$ and the vertical axis represents the pitch angle $\phi$, as described hereinbelow. Horizontal lines within the panoramic image represent longitudinal circles and vertical lines within the panoramic image represent latitudinal circles. Thus although the curves that form quadrilateral 420 may not appear naturally as arcs of great circles, within the coordinate system of the panoramic image they are indeed such arcs. Relative to spherical coordinates, the general equation for an arc of a great circle is given by equation (6) hereinbelow.

Similarly, in the case of a cylindrical panorama, the horizontal axis represents the yaw angle $\theta$ and the vertical axis represents the height y, as described hereinbelow. Horizontal lines within the panoramic image represent horizontally running circles and vertical lines within the panoramic image represent vertical lines. Relative to cylindrical coordinates, the general equation for an arc of a "great ellipse" is given by equation (9) hereinbelow.

Also shown in FIG. 4 is a center point 430. A user can drag any of the four points 410 independently of the others, so as to reshape the curved quadrilateral 420 as desired. A user can also drag the center point 430, so as to move the entire curved quadrilateral 420 with its vertices rigid.

Regardless of how the user positions the quadrilateral 430, its curved edges are automatically adjusted so as to correspond to the projections onto the sphere of the edges of a planar parallelogram situated somewhere in three-dimensional space. In other words, the quadrilateral 330 is always the projection of a planar parallelogram onto the sphere. The present invention provides an efficient way to find the appropriate location and orientation of the planar parallelogram.

Once the user has positioned the quadrilateral 430 as desired, then the image or video segmented to be composited onto the panorama can be correctly embedded. Specifically, a linear transformation that transforms the rectangular frame of the image or video onto the frame of the planar parallelogram is determined. Using this transformation, the image or video is transformed to a skewed image or video within the planar parallelogram, and then the resulting skewed image or video is projected onto the sphere.

Figure 5:
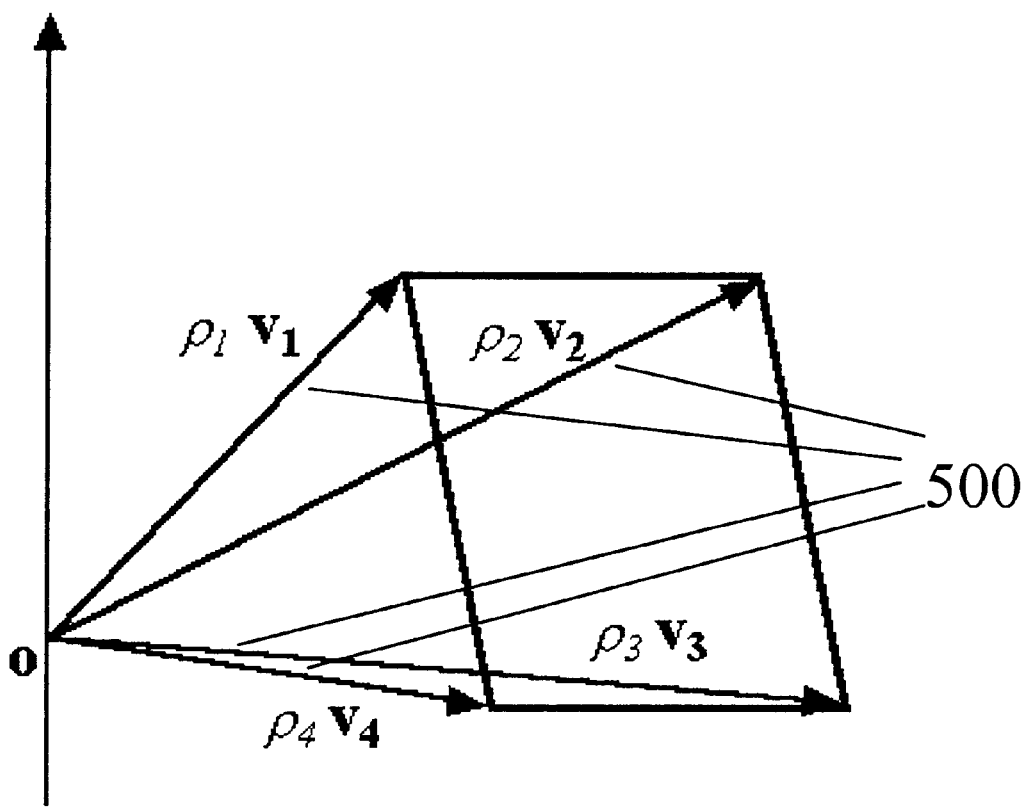
FIG. 5 illustrates a preferred method for identifying a planar parallelogram used in a preferred embodiment of the present invention.

Reference is now made to FIG. 5 which illustrates a preferred method for identifying the aforesaid planar parallelogram. Specifically, four direction vectors 500 on the surface of a cylinder or sphere are prescribed, and denoted $v_1$, $v_2$, $v_3$ and $v_4$. These four vectors all emanate from a viewing position in the center of the scene, and this position is taken to be the origin of a three-dimensional coordinate system. The present invention finds appropriate positive scalars $\rho_1$, $\rho_2$, $\rho_3$ and $\rho_4$ so that the scaled vectors $\rho_1 v_1$, $\rho_2 v_2$, $\rho_3 v_3$ and $\rho_4 v_4$ form the vertices of a planar parallelogram. This condition ensures that the vertices of the planar parallelogram project back onto the desired vectors $v_1$, $v_2$, $v_3$ and $v_4$, which is the sought after property.

The condition for four vectors to form the vertices of a parallelogram is that the vector differences that form the opposite sides of the parallelogram be identical. Specifically, in the above setup, the requirement is that the vectors $\rho_1 v_1 - \rho_2 v_2$ and $\rho_4 v_4 - \rho_3 v_3$, forming opposite edges, be equal. Equivalently, $$\rho_1 v_1 = \rho_2 v_2 - \rho_3 v_3 + \rho_4 v_4. \tag{1}$$

It is clear from the geometry that there is a degree of freedom, since any positive scalar multiple of a parallelogram whose vertices project onto the desired vectors $v_1$, $v_2$, $v_3$ and $v_4$ also has this projection property. In other words, the property that the planar parallelogram has a desired projection is invariant under scalar multiplication by positive scalars.

To pin down this degree of freedom, one can simply set $$\rho_1 = 1 \qquad (2)$$

and then the remaining scalars $\rho_2$, $\rho_3$ and $\rho_4$ can be determined from (1), by representing $v_1$ as a linear combination of $v_2$, $v_3$ and $v_4$. Indeed, as long as $v_2$, $v_3$ and $v_4$ are linearly independent, they form a set of basis vectors for three-dimensional space, and any vector in three-dimensional space belongs to their linear span. That is, there will be a unique set of scalars $\rho_2$, $\rho_3$ and $\rho_4$ satisfying (1).

However, in order for the parallelogram with vertices $\rho_1 v_1$, $\rho_2 v_2$, $\rho_3 v_3$ and $\rho_4 v_4$ to qualify, it is also necessary that the scalars $\rho_2$, $\rho_3$ and $\rho_4$ be positive. In order for this to happen the four vectors $v_1$, $v_2$, $v_3$ and $v_4$ must be such that no one of them lies in the cone generated by the other three.

The present invention also describes a method and system for displaying the projected edges of a planar parallelogram onto a surface such as a sphere or cylinder, so as to obtain a curved quadrilateral like quadrilateral 420 of FIG. 4. This is helpful to a user working with the user interface described hereinabove with reference to FIG. 4, as it shows the changing position of the curved frame for embedding the image or video as the user interactively positions it. Although the user is effectively only selecting the four vertex points of quadrilateral 420, it is far easier to carry out the manual positioning if the entire frame is shown to the user than if only the four vertices were shown.

As mentioned hereinabove, it is readily apparent to one skilled in the art that the surface being projected onto can be a general surface, and is not restricted to a sphere or cylinder. Use of a sphere or cylinder in the ensuing description is solely for the purpose of clarity and simplification.

Reference is now made back to FIG. 4, which illustrates how the user interface displays curved quadrilateral 420 corresponding to the projections of the edges of a planar parallelogram onto a sphere or cylinder. It will now be described how this curved quadrilateral is drawn. In order to project the parallelogram onto a sphere of cylinder, each of its four edges is projected individually. Each such edge lies in a unique plane through the origin, and the projection of the edge is a portion of the projection of the plane in which it lies. The projection of the edge is the desired curved quadrilateral edge which is to be displayed.

In the ensuing description a frame of reference is used in which the second of the three Cartesian coordinates, the y-coordinate, points in the vertical direction. In the case of a cylindrical panorama, the y-axis is the axis of rotation.

A key observation is that every plane through the origin has an equation $$x \cdot n = 0 \qquad (3)$$

where x denotes the position vector of a point in the plane, given by (x, y, z) in Cartesian (rectangular) coordinates, $n = (n_x, n_y, n_z)$ denotes a normal vector to the plane, and $x \cdot n$ denotes the scalar product (also referred to as the "dot product" or "inner product") of x with n. The plane (3) under discussion is the plane formed by the two vectors emanating from the origin and terminating at two adjacent vertices of the parallelogram. If this plane is projected through the origin onto a sphere centered about the origin, the projection is the great circle formed by the intersection of the plane with the sphere. The equation of its projection is the appropriate version of (3) in spherical coordinates.

Specifically, for a unit sphere, the coordinates of the position vector x are given in terms of the pitch and yaw angles $\phi$ and $\theta$, respectively, by:

$$x = (\cos\phi\cos\theta, \sin\phi, \cos\phi\sin\theta). \qquad (4)$$

Thus the equation of the projected plane (3) in spherical coordinates is $$n_x\cos\phi\cos\theta + n_y\sin\phi + n_z\cos\phi\sin\theta = 0, \qquad (5)$$

or equivalently, $$\tan\phi = -(n_x/n_y)\cos\theta - (n_z/n_y)\sin\theta. \qquad (6)$$

Equation (6) represents the general equation for a great circle in spherical coordinates. The right-hand side of equation (6) represents a general sinusoidal dependency.

As long as $n_y$ is non-zero, equation (6) determines $\phi$ as a function of $\theta$, and can be used for drawing the projected edge of the parallelogram. Specifically, as $\theta$ ranges between the two extreme values corresponding to the yaw angles of the edge vertices, equation (6) determines a corresponding value of $\phi$. The resulting ($\theta$, $\phi$) pairs map directly into pixel locations in the digital panorama.

If $n_y$ is zero, it means that two adjacent vertices of the parallelogram lie on the same great circle passing through the poles; that is, on the same line of latitude. In this case, both vertices have the same $\theta$ coordinate, and the projection is simply a portion of the great circle, ranging between the two pitch angles $\phi$ of the edge's vertices.

Similarly, if the plane (3) is projected onto a vertical cylinder centered about the origin with unit radius, then the projection is a planar ellipse centered at the origin. The only exceptional case is if the plane is vertical, in which case the projection is two diametrically opposite vertical lines running up an down the cylindrical surface. Using cylindrical coordinates, the position vector x is given in terms of the yaw angle $\theta$ and vertical length y by:

$$x = (\cos\theta, y, \sin\theta). \qquad (7)$$

Thus the equation of the projected plane (3) in cylindrical coordinates is $$n_x\cos\phi + y + n_z\sin\phi = 0. \qquad (8)$$

or equivalently, $$y = -(n_x/n_y)\cos\theta - (n_z/n_y)\sin\theta. \qquad (9)$$

Equation (9) represents the general equation for a "great ellipse" in cylindrical coordinates. The right-hand side of equation (9) represents a general sinusoidal dependency.

As long as $n_y$ is non-zero, equation (9) determines y as a function of $\theta$, and can be used for drawing the projected edge of the parallelogram. Specifically, as $\theta$ ranges between the two extreme values corresponding to the yaw angles of the edge vertices, equation (9) determines a corresponding value of y. The resulting ($\theta$, y) pairs map directly into pixel locations in the digital panorama.

If $n_y$ is zero, it means that two adjacent vertices of the parallelogram have the same yaw angle $\theta$. In this case, both vertices have the same $\theta$ coordinate, and the projection is simply a portion of a vertical line on the circumferential surface of the cylinder, ranging between the two elevations y of the edge's vertices.

Finally, it is noted that given two non-collinear vectors a and b, emanating from the origin, they determine a unique plane through the origin. A normal vector n to this plane is given by the cross product (also referred to as the "vector product") $n = a \times b$.

In a preferred embodiment, the present invention displays the curved edges of quadrilateral 420 as follows. For each edge of the parallelogram being projected, there is a unique plane through the origin that contains the edge. Form the cross product of the two vectors emanating from the origin and pointing to the vertices forming the endpoints of this edge. Find the values of θ for these two vectors. These values constitute the extreme values for θ in equation (6) or (9) above. Denote them by $\theta_1$ and $\theta_2$. Then for spherical geometry use equation (6) to compute positions (θ, φ) along the projected edge, as θ ranges between $\theta_1$ and $\theta_2$. For cylindrical geometry use equation (9) to compute positions (θ, y) along the projected edge, as θ ranges between $\theta_1$ and $\theta_2$. Drawing a curve through these positions displays the desired curved quadrilateral edge.

For the special case where the plane is vertical, θ is fixed. For spherical geometry, compute positions (θ, φ) by varying φ between the limits $\phi_1$ and $\phi_2$, where $\phi_1$ and $\phi_2$ are the pitch angles of the vectors pointing to the vertices of the edge. For cylindrical geometry, compute positions (θ, y) by varying y between the limits $y_1$ and $y_2$, where $y_1$ and $y_2$ are the elevations of the vertices of the edge. Drawing a curve through these positions displays the desired curved quadrilateral edge.

Figure 6:
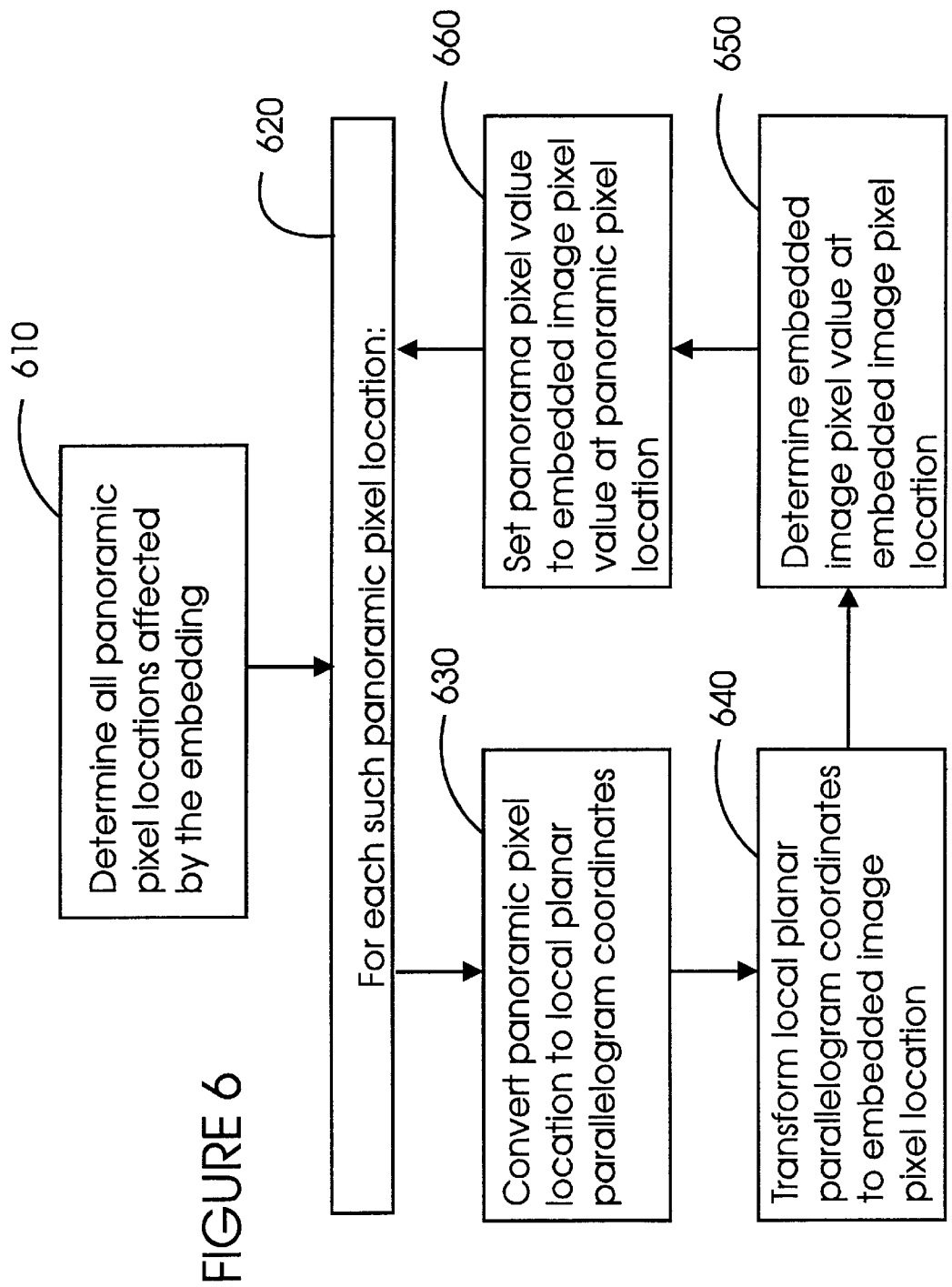
FIG. 6 is a simplified flowchart for embedding a desired image into a selected location within a panoramic image, in accordance with a preferred embodiment of the present invention.

Reference is now made to FIG. 6 which is a simplified flowchart for embedding a desired image into a selected location within a panoramic image, in accordance with a preferred embodiment of the present invention. The steps shown are implemented after the user has interactively selected an image or video to embed, and a desired location indicating where the embedded image or video should be situated. The user interface interactively determines the planar parallelogram described above, which projects onto the selected location. At step 610 a determination is made of all panoramic pixel locations within the panoramic image that are affected by the embedding. These are the panoramic pixel locations that correspond to points within the planar parallelogram. Step 620 loops over each panoramic pixel location identified in step 610. At step 630 each panoramic pixel location from step 620 is converted to local coordinates with the planar parallelogram. At step 640 the local parallelogram coordinates are transformed to pixel coordinates of the embedded image or video. At step 650 an embedded image pixel value is determined at the pixel coordinates computed in step 640, based on the embedded image pixel values. This step may involve some form of interpolation, as is well-known in the art, since typically the embed pixel coordinates are non-integral. Interpolation helps to avoid aliasing effects. At step 660, the panoramic pixel value used in step 620 is set to the pixel value determined in step 650.

Reference is now made to Appendix A which is a listing of exemplary software, in the form of C programming code, for implementing an application that draws a changing curved quadrilateral corresponding to a projected parallelogram as a user interactively positions its vertices. Appendix A contains listings of two files: PanoRect.h, which contains the function header declarations, and PanoRect.cpp, which contains the function definitions. The variables used in the listing in Appendix A are consistent with the notation used hereinabove. For example, the variables theta and phi refer to the same θ and φ hereinabove, and the second of the three Cartesian coordinates is taken to be in the vertical direction. However, a distinction between the variables used in the listing in Appendix A and the notation used hereinabove is that the arrays in the listing begin at index zero, whereas the indexing begins at one for the notation hereinabove. This is because the C programming language standard uses zero as the first index of an array. Thus the unit vectors $v_1$, $v_2$, $v_3$ and $v_4$ above correspond to ray [0] [ ], ray [1] [ ], ray [2] [ ] and ray [3] [ ] in the listing in Appendix A.

As can be seen in Appendix A, the listing for PanoRect.cpp begins with general vector arithmetic functions. The inline functions VecCrossProduct and VecDotProduct compute the standard cross product and dot product of two three-dimensional vectors.

The function RayPlaneIntersect computes the intersection pointRay of a vector in the direction of a given ray with a plane having local coordinates rectOrigin, rectRight and rectUp. The vector rectOrigin is the local origin of the plane, and the vectors rectRight and rectUp are its coordinate directions. Thus a vector in the plane with local coordinates U and V is given by $$\text{rectOrigin} + U^*\text{rectRight} + V^*\text{rectUp}.$$

Given a unit vector, the function RayPlaneIntersect finds the vector in the direction of the given unit vector which lies in the specified plane. The array pointRay serves as both the given unit vector that is input, as well as the point of intersection that is output. That is, the original array is over-written. The function RayPlaneIntersect uses the fact that if one desires to find a scalar c satisfying $$cx = O + au + bv, \tag{10}$$

then c is given by $$c = (x \cdot n)/(O \cdot n), \tag{11}$$

where n is the normal vector u×v.

The function Solve3x3 solves a 3×3 linear system of equations Ax=b by eliminating one variable and solving the resulting 2×2 system. The function FindAdjacentRay is used by the function ComputeRayOrdering to order the four rays in clockwise order, as illustrated in FIG. 4. The rays are stored in an array ray [4] [3]. Two rays are said to be adjacent if the plane they determine is such that other two rays fall on the same side of it. As successive rays are determined, a flag array fSelected [4] is used to mark them. The function ComputeAdjointBasis is used to find the adjoint basis u" and v" for a given basis u and v. The adjoint basis is characterized by the properties that u" and v" span the same plane as u and v, and moreover $$u \cdot u''=1, u \cdot v''=0, v \cdot u''=0, v \cdot v''=1. \tag{12}$$

The adjoint basis is useful for determining the coefficients of a vector $$x = au + bv, \tag{13}$$

since a and b can be determined by talking the scalar product of both sides of this equation with u" and v", respectively. It is used in this way in the functions CylCoords2UV and SphereCoords2UV described hereinbelow.

The listing for PanoRect.cpp continues with cylindrical coordinate utility functions. The function MakeCylRay produces a three-dimensional unit vector with Cartesian coordinates ray [0], ray [1] and ray [2], from the two cylindrical coordinates theta (circumferential angle) and h (height). The radius of the cylinder is taken to be one. The function Ray2CylCoords performs the inverse transformation, producing cylindrical coordinates theta and h from a unit vector having Cartesian coordinates ray [0], ray [1] and ray [2]. The function Cyl2ImageCoords converts floating point cylindrical coordinates theta and h to pixel coordinates X and Y within the panoramic image. The function Image2CylCoords performs the inverse conversion, from pixel coordinates X and Y to floating point cylindrical coordinates theta and h.

The listing for PanoRect.cpp continues with spherical coordinate utility functions. The function MakeSphereRay produces a three-dimensional unit vector with Cartesian coordinates ray [0], ray [1] and ray [2], from the two spherical coordinates theta (yaw angle—horizontal) and phi (pitch angle—vertical). The radius of the sphere is taken to be one. The function Ray2SphereCoords performs the inverse transformation, producing spherical coordinates theta and phi from a unit vector having Cartesian coordinates ray [0], ray [1] and ray [2]. The function Sphere2ImageCoords converts floating point spherical coordinates theta and phi to pixel coordinates X and Y within the panoramic image. The function Image2SphereCoords performs the inverse conversion, from pixel coordinates X and Y to floating point spherical coordinates theta and phi.

The listing for PanoRect.cpp continues with cylindrical coordinates rectangle drawing functions. InternalDrawCylLine draws a curve in a cylindrical panorama between the endpoints (theta1, h1) and (theta2, h2), the curve being characterized in that it is the projection of a straight line onto the cylinder. Specifically, this function uses equation (9) to draw line segments connecting the locus of positions ($\theta$, y) described above with reference to equation (9). The special case of a vertical line, where $n_y$ is zero, is also handled. The drawing itself is effected by the CDC class methods MoveTo (x, y), which moves a pen to a desired position (x, y) without drawing, and LineTo (x, y), which draws a line segment from the current pen position to a new position (x, y), and also moves the pen to this new position. The function DrawCylRectOutline draws the entire quadrilateral curve 420 from FIG. 4. It calls InternalDrawCylLine to draw each of the four edges. It also handles wrap-around, whereby the range for theta includes the 360° point.

The listing for PanoRect.cpp continues with spherical coordinates rectangle drawing functions. InternalDrawSphereLine draws a curve in a spherical panorama between the endpoints (theta1, phi1) and (theta2, phi2), the curve being characterized in that it is the projection of a straight line onto the sphere. Specifically, this function uses equation (6) to draw line segments connecting the locus of positions ($\theta$, $\phi$) described above with reference to equation (6). The special case of a vertical line, where $n_y$ is zero, is also handled. The function DrawSphereRectOutline draws the entire quadrilateral curve 420 from FIG. 4. It calls InternalDrawSphereLine to draw each of the four edges. It also handles wrap-around, whereby the range for theta includes the 360° point.

The listing for PanoRect .cpp continues with cylindrical coordinates geometry functions. The function PointInCylRect determines if a sample ray in the direction of pointTheta and pointH lies within the cone generated by four vertex rays with coordinates theta [4] and h [4]. It operates by using ComputeRayOrdering to order the four vertex rays, and then determines whether the sample ray lies on the same side of all four planes determined by adjacent vertex rays. The side of a plane on which the sample ray lies is determined from the scalar product of the sample ray with the plane's normal vector. This function is used with the function CylCoords2UV below, to embed the desired image in the panorama. Specifically, for each ray determined by pointTheta and pointH where PointInCylRect returns 1 (i.e. true), its local coordinates (U, V) within the planar parallelogram are determined, and then transformed back to pixel coordinates within the image to be embedded. The pixel value of the panoramic image at the location (pointTheta, pointH) is then set to the embedded image pixel value at these pixel coordinates.

The function CylCompute3dRect computes a planar parallelogram whose vertices map to four vertex rays with coordinates theta [4] and h [4], by means of projection onto the cylinder. It operates by solving the system of equations specified by equation (1). This system is a system of three linear equations for the three unknowns $\rho_2$, $\rho_3$ and $\rho_4$. The outputs of CylCompute3dRect are the three vectors rectOrigin, rectRight and rectUp, which correspond to the center of the parallelogram, half of the vector running along one of the sides of the parallelogram, and half of the vector running along the adjacent side of the parallelogram, respectively. Specifically, referring back to equation (1), the parallelogram's sides are given by the vectors $$v_1 - \rho_2 v_2 \text{ and } v_1 - \rho_4 v_4,$$

and its center is given by the vector $$(\rho_2 v_2 + \rho_4 v_4)/2.$$

The vectors rectRight, rectUp and rectOrigin are used to set up a relative coordinate system inside the planar parallelogram. This is necessary so that locations within the planar parallelogram can be referenced by a local coordinate system. The local parallelogram coordinates are then transformed back to pixel coordinates within the image being embedded. The vectors rectRight and rectUp form the coordinate directions relative to the frame of the planar parallelogram, and rectorigin is the relative origin. Thus a location (U, V) within the planar parallelogram corresponds to the three-dimensional vector $$\text{rectOrigin} + U^*\text{rectRight} + V^*\text{rectUp}.$$

Conversely, the function CylCoords2UV converts a vector from three-dimensional Cartesian coordinates to local coordinates within the planar parallelogram. It uses the fact that if a vector x lies within the plane spanned by non-collinear vectors u and v, so that x=a u+b v for some coefficients a and b, then these coefficients a and b are given by $$a = \bullet u'', \ b = x \bullet v'', \tag{14}$$

where u" and v" form the adjoint basis to u and v. The vector x being converted is the vector in the direction of a given cylindrical unit vector determined by pointTheta and pointH, and lying within the plane of the parallelogram.

The function ComputeCylRect computes the four vertices of quadrilateral 420 from a planar parallelogram specified by the three vectors rectOrigin, rectRight and rectUp. It operates by adding or subtracting rectRight and rectUp with RectOrigin, as appropriate, for each specific vertex location relative to the center of the parallelogram.

The listing for PanoRect.cpp continues with spherical coordinates geometry functions. The function PointInSphereRect determines if a sample ray in the direction of pointTheta and pointPhi lies within the cone generated by four vertex rays with coordinates theta [4] and phi [4]. It operates by using ComputeRayOrdering to order the four vertex rays, and then determines whether the sample ray lies on the same side of all four planes determined by adjacent vertex rays. The side of a plane on which the sample ray lies is determined from the scalar product of the sample ray with the plane's normal vector. This function is used with the function SphereCoords2UV below, to embed the desired image in the panorama. Specifically, for each ray determined by pointTheta and pointH where PointInSphereRect returns 1 (i.e. true), its local coordinates (U, V) within the planar parallelogram are determined, and then transformed back to pixel coordinates within the image to be embedded. The pixel value of the panoramic image at the location (pointTheta, pointPhi) is then set to the embedded image pixel value at these pixel coordinates.

The function SphereCompute3dRect computes a planar parallelogram whose vertices map to four vertex rays with coordinates theta[4] and phi [4], by means of projection onto the cylinder. It operates by solving the system of equations specified by equation (1). This system is a system of three linear equations for the three unknowns $\rho_2$, $\rho_3$ and $\rho_4$. The outputs of SphereCompute3dRect are the three vectors rectOrigin, rectRight and rectUp, which correspond to the center of the parallelogram, half of the vector running along one of the sides of the parallelogram, and half of the vector running along the adjacent side of the parallelogram, respectively. Specifically, referring back to equation (1), the parallelogram's sides are given by the vectors $$v_1 - \rho_2 v_2 \text{ and } v_1 - \rho_4 v_4,$$

and its center is given by the vector $$(\rho_2 v_2 + \rho_4 v_4)/2.$$

The vectors rectRight, rectUp and rectOrigin are used to set up a relative coordinate system inside the planar parallelogram. This is necessary so that locations within the planar parallelogram can be referenced by a local coordinate system. The local parallelogram coordinates are then transformed back to pixel coordinates within the image being embedded. The vectors rectRight and rectUp form the coordinate directions relative to the frame of the planar parallelogram, and rectOriginis the relative origin. Thus a location (U, V) within the planar parallelogram corresponds to the three-dimensional vector $$\text{rectOrigin} + U^* \text{rectRight} + V^* \text{rectUp}.$$

Conversely, the function SphereCoords2UV converts a vector from three-dimensional Cartesian coordinates to local coordinates within the planar parallelogram, as described hereinabove with reference to equation (14). The vector being converted is the vector in the direction of a given spherical unit vector determined by pointTheta and pointPhi, and lying within the plane of the parallelogram.

The function ComputeSphereRect computes the four vertices of quadrilateral 420 from a planar parallelogram specified by the three vectors rectOrigin, rectRight and rectUp. It operates by adding or subtracting rectRight and rectUp with RectOrigin, as appropriate, for each specific vertex location relative to the center of the parallelogram.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

What is claimed is:

1. A method for constructing a panoramic image comprising the steps of:

applying panoramic curvature to at least one image, thereby to create a panoramic background; and embedding in said panoramic background an additional image having a geometry other than that of said panoramic curvature, thereby to provide a composite panoramic image containing an embedded image corresponding to said additional image and whose geometry matches that of the panoramic background.

2. The method of claim 1 and wherein said embedding step applies said panoramic curvature to said additional image.

3. The method of claim 1 and wherein said panoramic curvature corresponds to curvature of a geometrical surface.

4. The method of claim 3 and wherein said embedding step includes selecting an embedding location for embedding said additional image.

5. The method of claim 4 and wherein said selecting step uses four user-specified vertices within said panoramic background to select said embedding location.

6. The method of claim 5 and wherein said embedding step includes determining a planar parallelogram characterized in that its four vertices, when projected onto said geometrical surface, project onto said four user-specified vertices.

7. The method of claim 6 and wherein said panoramic background contains pixel locations with pixel values, and said embedding step includes:

identifying panorama pixel locations of said panoramic background that lie within the projection of said planar parallelogram onto said geometrical surface;

transforming each of said panorama pixel locations into local coordinates in said planar parallelogram;

transforming said local coordinates in said planar parallelogram into an embedded pixel location of said additional image;

computing an embedded pixel value at said embedded pixel location of said additional image; and modifying the pixel value of said panoramic background at said panorama pixel location based upon said embedded pixel value.

8. The method of claim 7 and wherein said identifying step uses the four vertices of said planar parallelogram to test if a candidate panorama pixel location lies within the projection of said planar parallelogram onto said geometrical surface.

9. The method of claim 7 and wherein said second transforming step uses a linear transformation.

10. The method of claim 7 and wherein said computing step uses linear interpolation based on pixel values of said additional image at pixel locations in the vicinity of said embedded pixel location.

11. The method of claim 7 and wherein said modifying step replaces said pixel value of said panoramic background with said embedded pixel value.

12. The method of claim 6 and whereby said four user-positioned vertices are interactively specified by means of a user interface.

13. The method of claim 12 and wherein said user interface enables a user to interactively adjust at least one of said four user-positioned vertices by means of an input device.

14. The method of claim 13 and wherein said user interface interactively displays a curved quadrilateral framing a projection of said planar parallelogram onto said geometrical surface.

15. The method of claim 14 and wherein said user interface also interactively displays a center point corresponding to a projection of the center of said planar parallelogram onto said geometrical surface.

16. The method of claim 15 and wherein said user interface also enables a user to interactively move said center dpoint by means of an input device.

17. A panoramic image production system comprising:

an image processor applying panoramic curvature to at least one image, thereby to create a panoramic background; and an image compositor, embedding in said panoramic background an additional image having a geometry other than that of said panoramic curvature, thereby to provide a composite panoramic image containing an embedded image corresponding to said additional image and whose geometry matches that of the panoramic background.

18. The system of claim 17 and wherein said image compositor applies said panoramic curvature to said additional image.

19. The system of claim 17 and wherein said panoramic curvature corresponds to curvature of a geometrical surface.

20. The system of claim 19 and wherein said image compositor includes a selector, selecting an embedding location for embedding said additional image.

21. The system of claim 20 and wherein said selector uses four user-specified vertices within said panoramic background to select said embedding location.

22. The system of claim 21 and wherein said image compositor includes a geometry processor, determining a planar parallelogram characterized in that its four vertices, when projected onto said geometrical surface, project onto said four user-specified vertices.

23. The system of claim 22 and wherein said panoramic background contains pixel locations with pixel values, and said image compositor includes:

a pixel processor, identifying panorama pixel locations of said panoramic background that lie within the projection of said planar parallelogram onto said geometrical surface;

a first pixel transformer, transforming each of said panorama pixel locations into local coordinates in said planar parallelogram;

a second pixel transformer, transforming said local coordinates in said planar parallelogram into an embedded pixel location of said additional image;

a pixel computer, computing an embedded pixel value at said embedded pixel location of said additional image; and a pixel modifier, modifying the pixel value of said panoramic background at said panorama pixel location based upon said embedded pixel value.

24. The system of claim 23 and wherein said pixel processor uses the four vertices of said planar parallelogram to test if a candidate panorama pixel location lies within the projection of said planar parallelogram onto said geometrical surface.

25. The system of claim 23 and wherein said second pixel transformer is a linear transformer.

26. The system of claim 23 and wherein said pixel computer uses linear interpolation based on pixel values of said additional image at pixel locations in the vicinity of said embedded pixel location.

27. The system of claim 23 and wherein said pixel modifier replaces said pixel value of said panoramic background with said embedded pixel value.

28. The system of claim 22 and including a user interface for interactively specifying four user-positioned vertices.

29. The system of claim 28 and wherein said user interface includes a position adjuster, enabling a user to interactively adjust at least one of said four user-positioned vertices by means of an input device.

30. The system of claim 29 and wherein said user interface includes a display, interactively displaying a curved quadrilateral framing a projection of said planar parallelogram onto said geometrical surface.

31. The system of claim 30 and wherein said display also interactively displays a center point corresponding to a projection of the center of said planar parallelogram onto said geometrical surface.

32. The system of claim 31 and wherein said position adjuster also enables a user to interactively move said center point by means of an input device.

* * * * *